United States Patent [19]
Vidacovich et al.

[11] Patent Number: 5,734,775
[45] Date of Patent: Mar. 31, 1998

[54] METHOD AND SYSTEM FOR FIBER OPTIC SPLICE ACTIVATION AND DEACTIVATION WITHIN AN OPTICAL FIBER DISTRIBUTION FRAME

[76] Inventors: Kenneth John Vidacovich, 11405 Indian Head Dr., Austin, Tex. 78753; Jerome Allen Pratt, 2203 Terry La., Georgetown, Tex. 78628

[21] Appl. No.: 596,025

[22] Filed: Feb. 6, 1996

[51] Int. Cl.⁶ ............................................. G02B 6/00
[52] U.S. Cl. ..................... 385/134; 385/135; 385/136; 385/137
[58] Field of Search ................. 385/134, 135, 385/136, 137, 138, 139, 147; 29/267

[56] References Cited

U.S. PATENT DOCUMENTS

| | | | |
|---|---|---|---|
| 4,416,506 | 11/1983 | Johnson et al. | 350/96.21 |
| 4,781,430 | 11/1988 | Tamaka et al. | 350/96.2 |
| 4,890,896 | 1/1990 | Meis | 350/96.21 |
| 4,997,255 | 3/1991 | Lukas et al. | 350/96.21 |
| 5,029,972 | 7/1991 | Lukas et al. | 350/96.21 |
| 5,074,021 | 12/1991 | Feng et al. | 29/281.5 |
| 5,078,467 | 1/1992 | Blomgren et al. | 385/56 |
| 5,155,900 | 10/1992 | Grois et al. | 29/758 |
| 5,191,632 | 3/1993 | Mansfield et al. | 385/134 |
| 5,193,259 | 3/1993 | Konik | 29/267 |
| 5,402,515 | 3/1995 | Vidacovich et al. | 385/135 |
| 5,420,958 | 5/1995 | Henson et al. | 385/135 |
| 5,450,517 | 9/1995 | Essert | 385/135 |

FOREIGN PATENT DOCUMENTS

| | | |
|---|---|---|
| 0384678A3 | 8/1990 | European Pat. Off. |
| 95/23991 | 9/1995 | WIPO |

OTHER PUBLICATIONS

3M Instructions: Fibrlok™ Optical Fiber Splicing System—Issue 5, Oct. 1990.
3M Brochure: 2750 Hub-in-a-Box High Density Fiber Optic Distribution System Jun. 1994.
3M Instructions: 2750 Hub-in-a-Box High Density Fiber Optic Distribution System—Jun. 1994, Issue 1, 34-7036-2298-4.

*Primary Examiner*—Phan T. H. Palmer
*Attorney, Agent, or Firm*—Gary L. Griswold; Walter N. Kirn; Gerald F. Chernivec

[57] ABSTRACT

A method and system for activating and deactivating a fiber optic splice within an optical fiber distribution frame while the fiber optic splice is releasably retained within a connector tray within the optical fiber distribution frame. The connector tray preferably includes multiple slots for supporting a number of mechanically activatable fiber optic splices which each include a jacket and a cap which is retained in a first intermediate position within the jacket while the fiber optic splice is deactivated and in a second fully inserted position within the jacket while the fiber optic splice is activated. An activator tool is provided which includes a stop member and slidably mounted pivot member which may be utilized to engage the fiber optic splice jacket and urge the cap into the fully inserted position in response to relative movement between the pivot member and the stop member in order to activate the fiber optic splice while the fiber optic splice is retained within the connector tray. Clips attached to the slidably mounted pivot member within the activator tool may also be inserted into recesses within the fiber optic splice jacket and utilized to urge the cap out of the jacket into the intermediate position to deactivate the fiber optic splice while the fiber optic splice is retained within the connector tray.

8 Claims, 6 Drawing Sheets

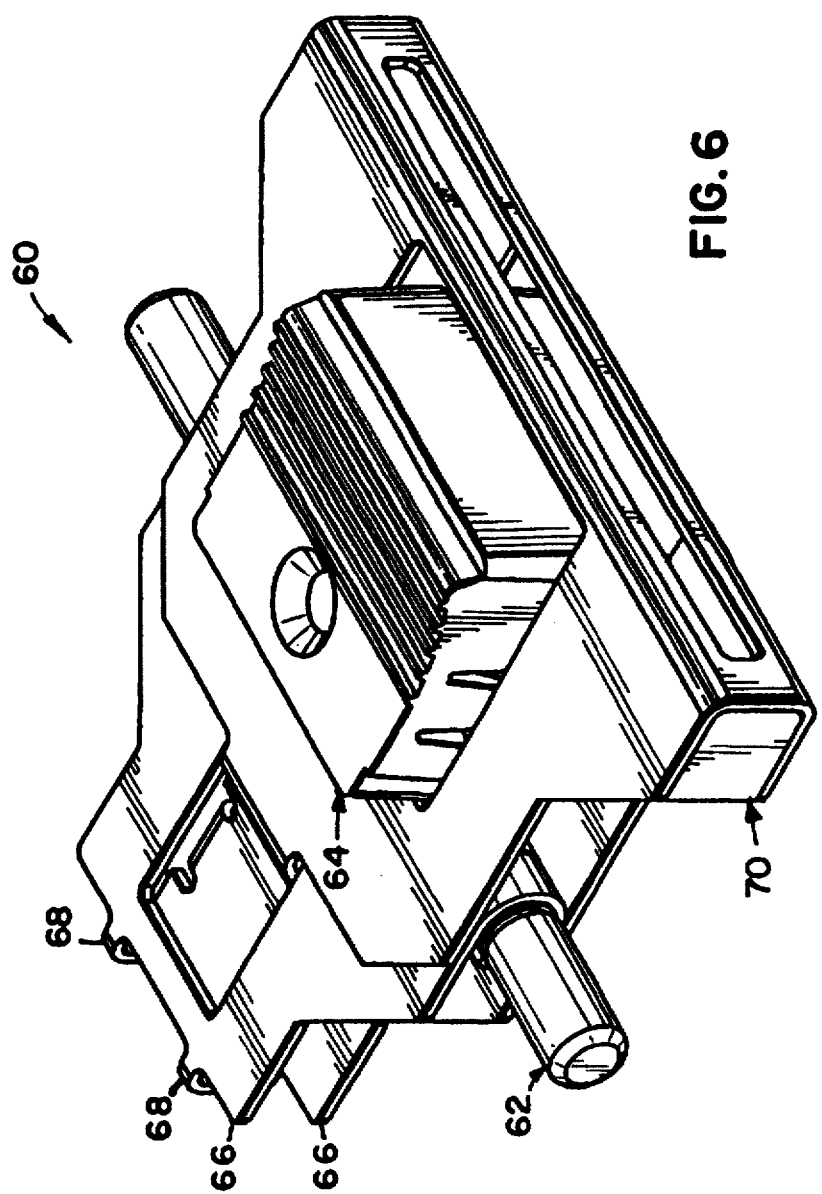

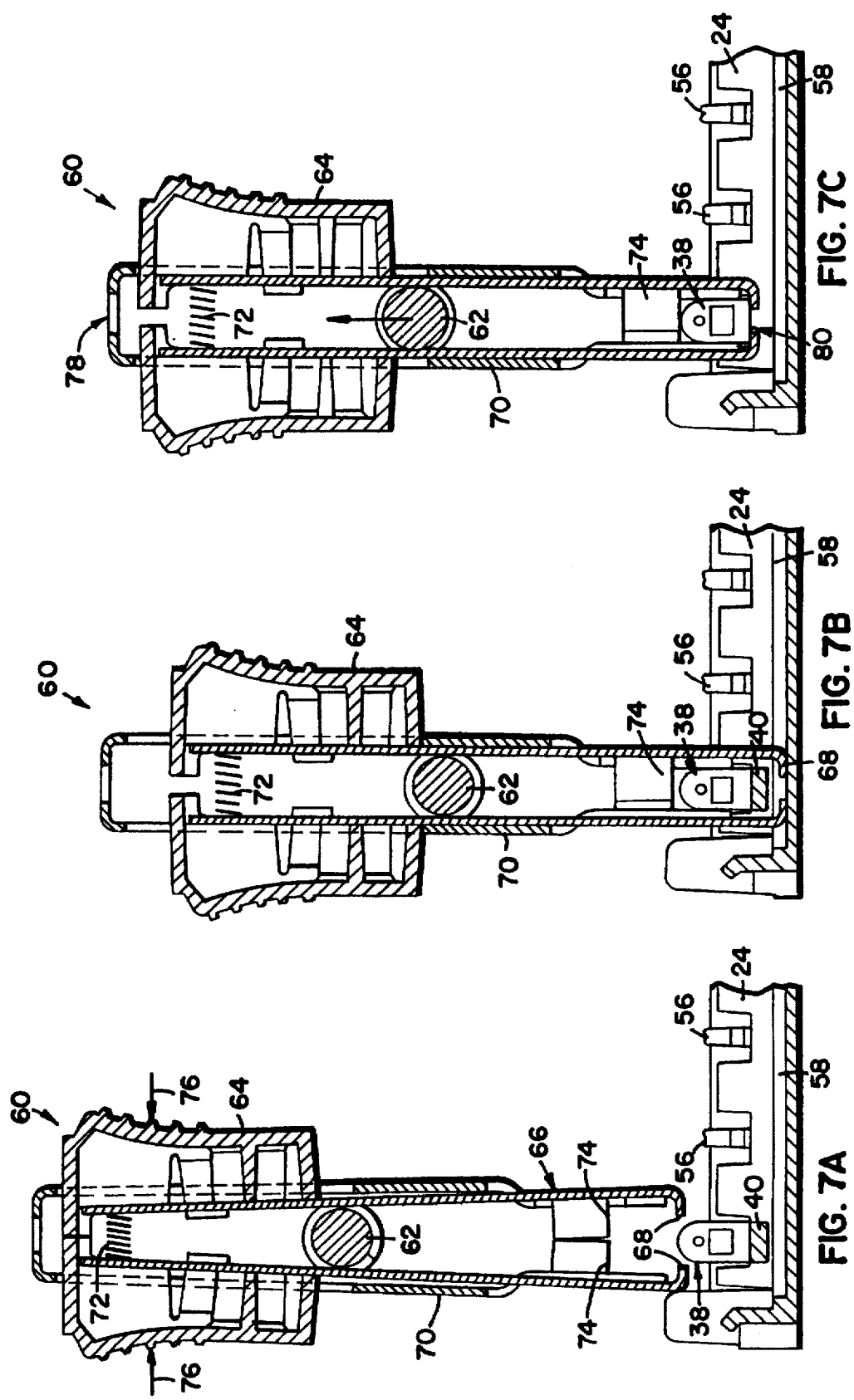

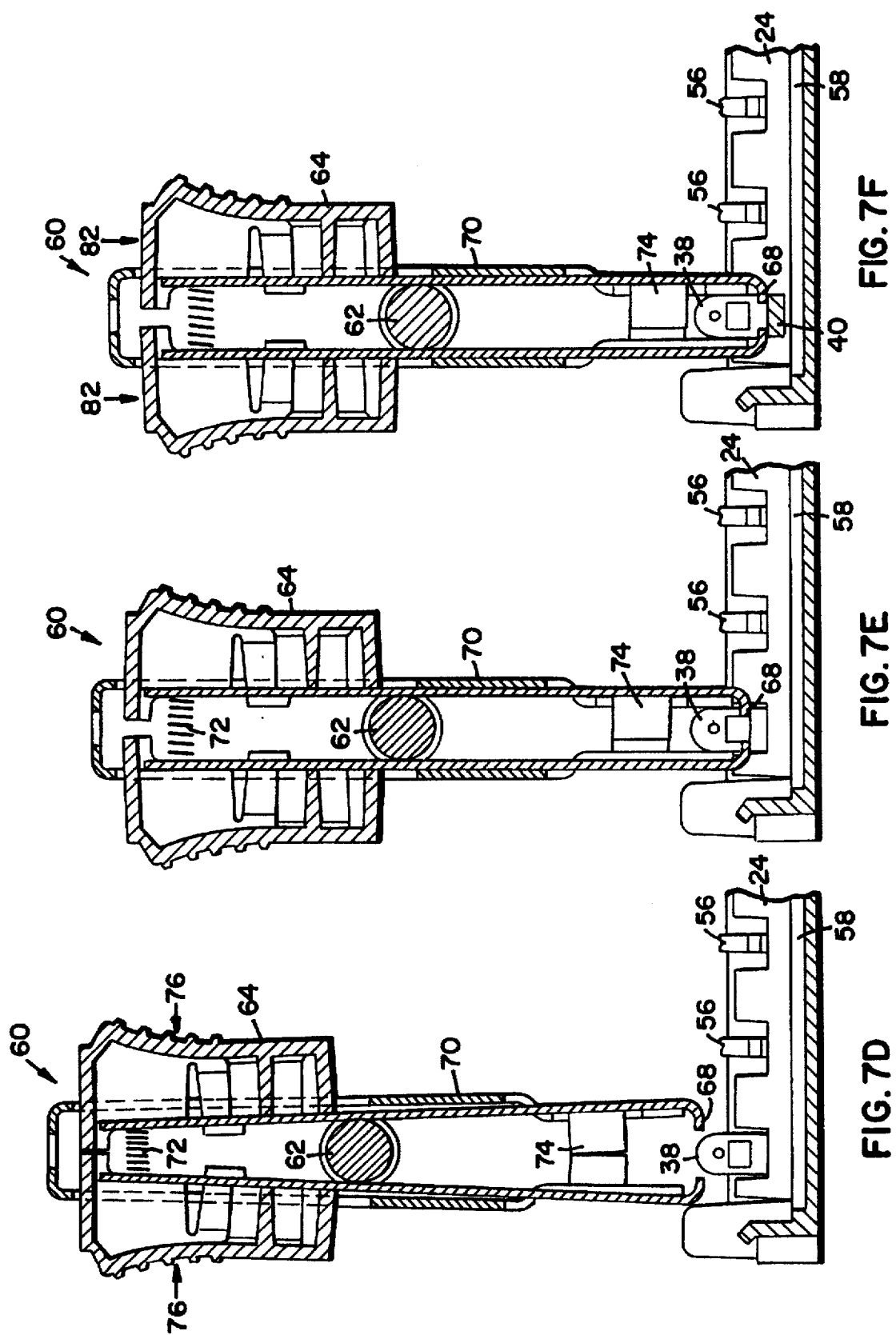

METHOD AND SYSTEM FOR FIBER OPTIC SPLICE ACTIVATION AND DEACTIVATION WITHIN AN OPTICAL FIBER DISTRIBUTION FRAME

BACKGROUND OF THE INVENTION

1. Technical Field

The present invention relates in general to the field of fiber optic cabling and in particular to an improved method and system for activating and deactivating a fiber optic splice. Still more particularly the present invention relates to an improved method and system for activating and deactivating a fiber optic splice while a splice is retained within an optical fiber distribution frame wherein stress induced within optical fibers within the optical fiber distribution frame by movement of a fiber optic splice may be minimized.

2. Description of the Related Art

Field installation, service and repair of optical fiber systems can be a delicate, time consuming and often troublesome procedure due to the fragile nature of the components involved, particularly the optical fiber itself. Optical fibers are typically made of a material such as quartz, multi-component glass or synthetic resins and in view of their generally small diameter, such fibers are susceptible to permanent deformation when undergoing a force exerted in a direction at right angles to the fiber axis. For example, optical fibers made of quartz or multi-component glass are liable to break, and those made of synthetic resins are liable to bend or break under such a force.

A composite fiber optic cable typically includes an outer jacket, an inner buffer and a central or axial clad optical fiber or fibers. The outer jacket and the inner buffer are usually fabricated of flexible, tubular plastic material. Strength members, such as elongated strands, may be incorporated between the outer jacket and the inner buffer to protect the fiber and provide longitudinal strength for the cable while permitting easy manual manipulation of the cable itself.

In order to terminate an optical fiber or to assemble the cable/fiber in a connector or splice, the outer jacket and inner buffer normally are removed to expose a length of the small brittle optical fiber therein. In terminating such a fiber within an optical fiber connector, for example, the connector often includes a ferrule, such as ceramic material, having a small center bore through which the fiber extends and barely protrudes from a distal end thereof for connection or mating with the fiber of a complementary connector.

Additionally, alternate splice designs exist which may be utilized with special assemblies or tools for preparation of the fibers and creation of the splice. For example, an early patent to Cherin et al., U.S. Pat. No. 4,028,162, describes the use of inclined ramps to guide a plurality of fibers in two ribbon cables toward a plastic substrate having fiber receiving grooves. An embossing head is then utilized to clamp a cover plate over the grooved substrate.

Another tool utilized in joining multiple ribbon cables is depicted in U.S. Pat. No. 4,123,137, issued to E. Marcatili, and includes two holders having alignment pegs for the ribbons, one of the holders being slidable along a pair of rods to cause a first ribbon to abut a second ribbon. A grooved cover plate helps align the fibers during curing of the bonding material.

Two assembly tools or jigs for discrete fiber splices are disclosed in U.S. Pat. No. 4,940,307, issued to Aberson et al., and U.S. Pat. No. 5,029,972, issued to Lukas et al. The Aberson et al. jig is fairly simple and essentially comprises a holder having two arms with slots which receive ribs on the underside of the spliced body. The Lukas et al. jig however, is more complicated. That jig has a slot utilized to secure a special spliced body, and two adjacent fingers which are utilized to push a gripping member in the body that overlies the splice area. A lever having a roller at the operative end thereof is utilized to actuate both the fingers and a compression member disposed opposite the fingers with respect to the spliced body. When the lever is moved to a first position, the roller indirectly causes the fingers to push the gripping member away from the splice area, easing insertion of the fibers. When the lever is moved to a second position it forces the compression member against the opposite side of the gripping member, pushing the gripping member towards the fibers and clamping them. The jig also has a pair of slitted foam blocks for supporting the fibers proximate the splice area.

More recently, another device has been proposed which is reminiscent of the Lukas et al. jig. This device is an assembly tool sold by Minnesota Mining and Manufacturing Company (3M), the assignee of the present application, which in conjunction with the FIBRLOK optical fiber splice (FIBRLOK is a trademark of 3M) may be utilized to create fiber optic splices. That tool has a cradle area for receiving the FIBRLOK splice body, and foam retention pads adjacent to the splice area for supporting the fibers. A lever pivots over and onto the upper surface of the cradle splice body. This lever has a compression surface which forcibly contracts the cap of the FIBRLOK, and snaps it into the fully inserted actuated position.

After creating a splice using one of these tools, the splice must then typically be placed within an optical fiber distribution frame where multiple fiber optic cables are terminated and spliced. As described above, the brittle nature of optical fiber cables requires great care in that mechanical stresses may be accidentally induced within the splice or within adjacent splices during the placement of the FIBRLOK splice within an optical fiber distribution frame.

It should therefore be apparent that a need exists for a method and system whereby fiber optic splices may be activated and deactivated while retained within an optical fiber distribution frame such that torsional or mechanical stresses induced within optical fibers by the movement thereof may be minimized.

SUMMARY OF THE INVENTION

It is therefore one object of the present invention to provide an improvement in the field of fiber optic cabling.

It is another object of the present invention to provide an improved method and system for activating and deactivating a fiber optic splice.

It is yet another object of the present invention to provide an improved method and system for activating and deactivating a fiber optic splice while the fiber optic splice is retained within an optical fiber distribution frame wherein stress induced within optical fibers within the optical fiber distribution frame by movement of a fiber optic splice may be minimized.

The foregoing objects are achieved as is now described. The method and system of the present invention may be utilized to activate and deactivate a fiber optic splice within an optical fiber distribution frame while the fiber optic splice is releasably retained within a connector tray within the optical fiber distribution frame. The connector tray preferably includes multiple slots for supporting a number of mechanically activatable fiber optic splices which each include a jacket and a cap which is retained in a first intermediate position within the jacket while the fiber optic splice is deactivated and in a second fully inserted position within the jacket while the fiber optic splice is activated. An activator tool is provided which includes a stop member and a slidably mounted pivot member which may be utilized to engage the fiber optic splice jacket and urge the cap into the fully inserted position in response to relative movement between the pivot member and the stop member in order to activate the fiber optic splice while the fiber optic splice is retained within the connector tray. Clips attached to the slidably mounted pivot member within the activator tool may also be inserted into recesses within the fiber optic splice jacket and utilized to urge the cap out of the jacket into the intermediate position to deactivate the fiber optic splice while the fiber optic splice is retained within the connector tray.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a perspective view of an activator tool which may be utilized to activate and deactivate fiber optic splices while the fiber optic splices are mounted within the connector tray of FIG. 5 to implement the method and system of the present invention; and FIGS. 7A–7F comprise a series of sectional views which illustrate the activation and deactivation of a fiber optic splice utilizing the activator tool of FIG. 6 in accordance with the method and system of the present invention.

DETAILED DESCRIPTION OF PREFERRED EMBODIMENT

Figure 1:
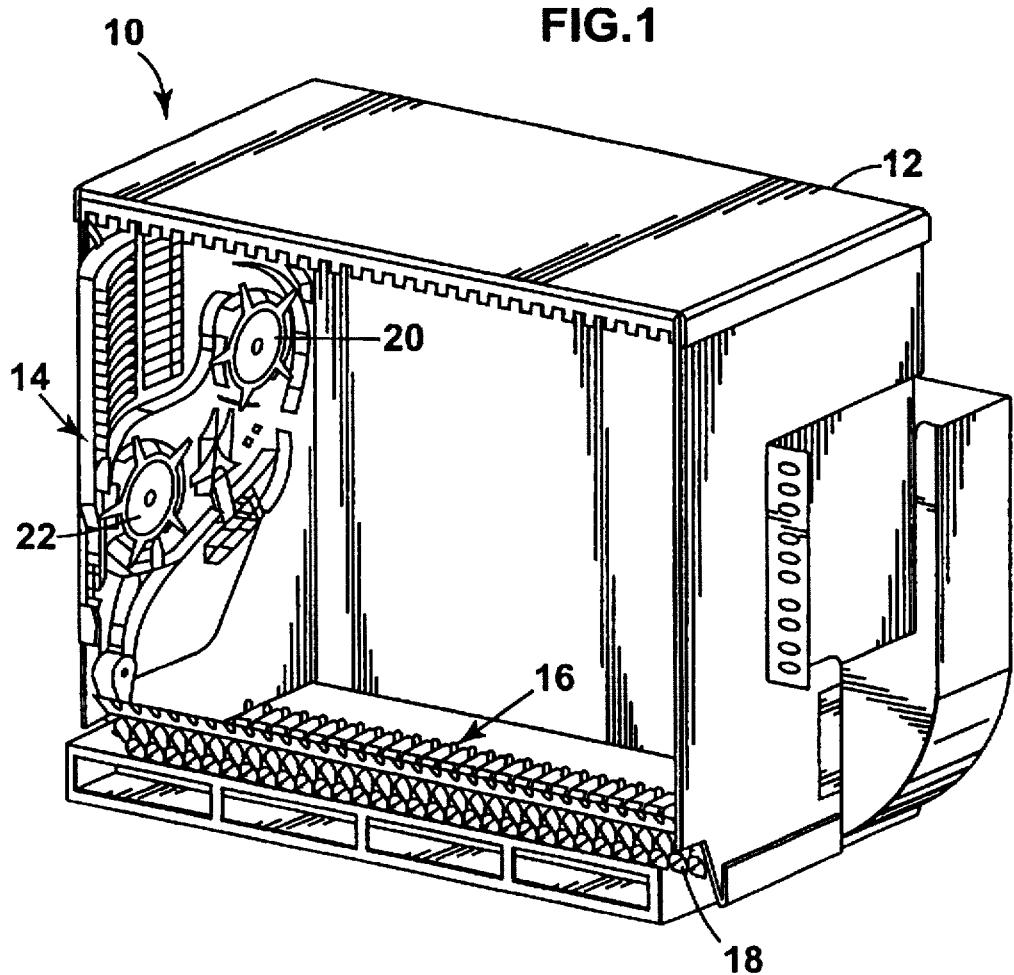
FIG. 1 is a pictorial representation of a fiber optic distribution frame which may be utilized to implement the method and system of the present invention.

With reference now to the figures and in particular with reference to FIG. 1, there is depicted a pictorial representation of a fiber optic distribution system 10 which may be utilized to implement the method and system of the present invention. System 10 is a fiber optic distribution system similar to those utilized in the prior art. An illustrative example of such a fiber optic distribution system may be seen in U.S. Pat. No. 5,402,515, issued Mar. 28, 1995, and assigned to the assignee herein named. The content of that patent is hereby incorporated herein by reference thereto.

Still referring to FIG. 1, it may be seen that fiber optic distribution system 10 includes a frame 12 which may be utilized to retain a plurality of connector cards 14. For purposes of illustration, a single connected card 14 is depicted. Fiber optic distribution system 10 also includes a plurality of brackets 16 which are mounted within the cabinet which may be utilized to secure back plane spiral wrap tubing and a plurality of ribs 18 are also provided in order to limit the radius of the back plane fiber optic cable.

Each connector card 14 includes a back plane slack storage area 20 and a front plane slack storage area 22 which are placed near each other in order to allow rerouting and direct interconnection of front and back plane fibers without disturbing the interconnection area. In this manner, fiber optic distribution system 10 provides for custom circuit path arrangements, allowing field termination of in-line fiber devices, as well as fiber pass-through applications, in addition to traditional cross-connect and interconnect functions.

A connector tray 24 is also provided within connector cord 14 which may be utilized to retain mechanically activatable fiber optic splices which, in accordance with the illustrated embodiment of the present invention, may be activated and deactivated while releasably retained within connector tray 24.

Figure 2:
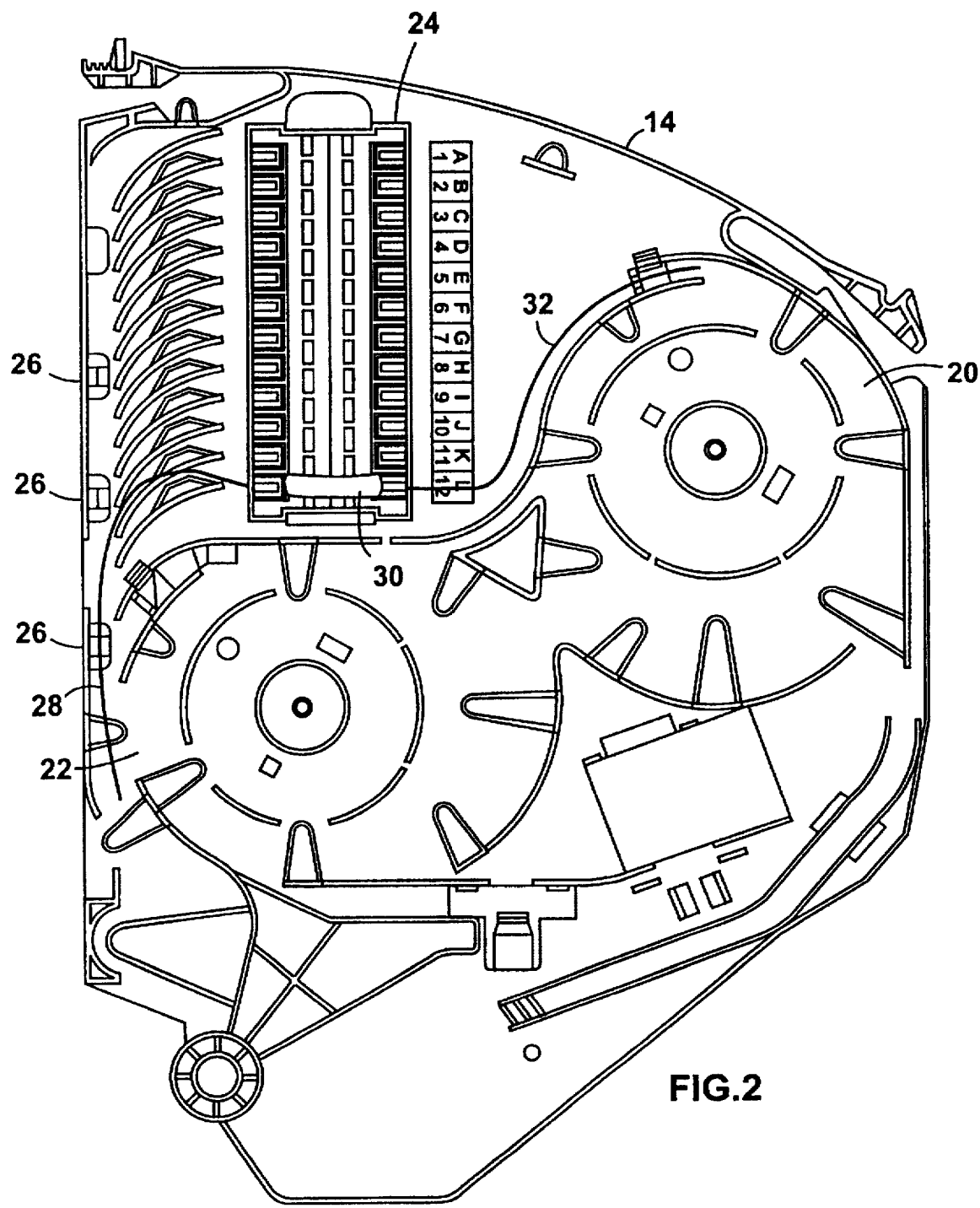
FIG. 2 is a pictorial view of a connector card which may be utilized within the fiber optic distribution frame of FIG. 1 to implement the method and system of the present invention.

Referring now to FIG. 2, there is depicted a pictorial view of a connector card 14 which may be utilized within the fiber optic distribution system of FIG. 1 in order to implement the method and system of the present invention. As illustrated, located adjacent to back plane slack storage area 20 and front plane slack storage area 22 is connector tray 24 which may be utilized to releasably retain a mechanically activatable fiber optic splice, such as fiber optic splice 30. In a manner which will be explained in greater detail herein, connector card 14, in the depicted illustration of the present invention, may be utilized to connect and disconnect fiber optic cables utilizing a mechanically activatable mechanical fiber optic splice device which is retained during the operation within connector tray 24.

As depicted, a front plane fiber optic cable 28 may be threaded through one of a plurality of fiber retention clips 26 and placed within fiber optic splice 30. Similarly, a back plane fiber optic cable 32 may be placed within fiber optic splice 30 and fiber optic splice 30 may then be activated, within connector tray 14 when utilizing the method and system of the present invention.

Figure 3:
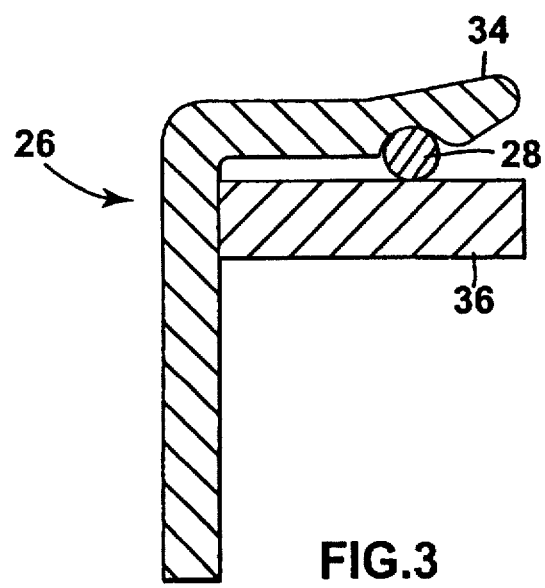
FIG. 3 is a sectional view of a fiber retention clip which may be utilized in conjunction with the connector card of FIG. 2 to implement the method and system of the present invention.

Referring now to FIG. 3, there is depicted a sectional view of a fiber retention clip 26 which may be utilized in conjunction with the connector card of FIG. 2 in order to implement the method and system of the present invention. As depicted within FIG. 2 fiber retention clip 26 may be utilized to impose a bow within front plane fiber optic cable 28 in order to ensure that a proper mechanical connection between front plane fiber optic cable 28 and back plane fiber optic cable 32 is maintained during the activation of fiber optic splice 30. As depicted within FIG. 3, fiber retention clip 26 preferably includes a flexible member 34 and a rigid member 36 which may be utilized, in the manner depicted within FIG. 3, to temporarily restrain front plane fiber optic cable 28. In this manner, longitudinal movement of front plane fiber optic cable 28 may be temporarily prohibited, permitting a user to impose a bow within the cable in the manner described above.

Figure 4:
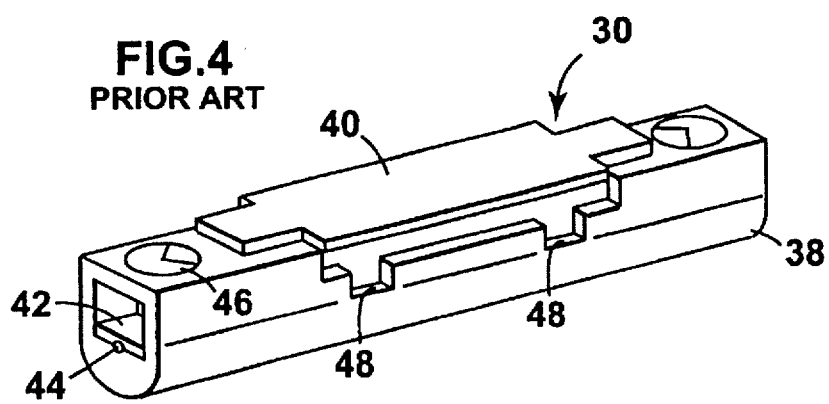
FIG. 4 is a perspective pictorial view of a prior art fiber optic splice which may be utilized in conjunction with the connector card of FIG. 2 to implement the method and system of the present invention.

Referring now to FIG. 4, there is depicted a perspective pictorial view of a prior art fiber optic splice which may be utilized in conjunction with the connector tray of FIG. 2 in order to implement the method and system of the present invention. An illustrated example of this fiber optic splice is disclosed in co-pending U.S. patent application Ser. No. 08/587,771, filed Dec. 22, 1995, and assigned to the assignee herein named. As illustrated, fiber optic splice 30 includes a jacket 38 which is designed to receive cap 40. As those skilled in the art will appreciate, cap 40 may be retained within jacket 38 in a first intermediate position when fiber optic splice 30 is deactivated and in a second, fully inserted position when fiber optic splice 30 has been activated. An end plug 42 is present within each of the distal ends of fiber optic splice 30 and will be utilized, as will be explained below, in order to releasably retain fiber optic splice 30 within connector card 14.

A fiber entry port 44 is present within each of the distal ends of fiber optic splice 30 and is utilized to receive either front plane fiber optic cable 28 or back plane fiber optic cable 32 in order to assemble a fiber optic splice. Finally, recesses 48 are provided within jacket 38 such that cap 40 may be removed from jacket 38 after having been placed in the fully inserted activated position. In this manner, fiber optic splice 30 may be disassembled utilizing an appropriate tool. A size designation indication 46 is also typically present within a fiber optic splice 30 and is utilized to indicate the appropriate size fiber optic cable which may be spliced utilizing this device. An illustrative example of fiber optic splice 30 is the FIBRLOK™ optical fiber splicing system manufactured by Minnesota Mining and Manufacturing Company of St. Paul, Minn.

Figure 5:
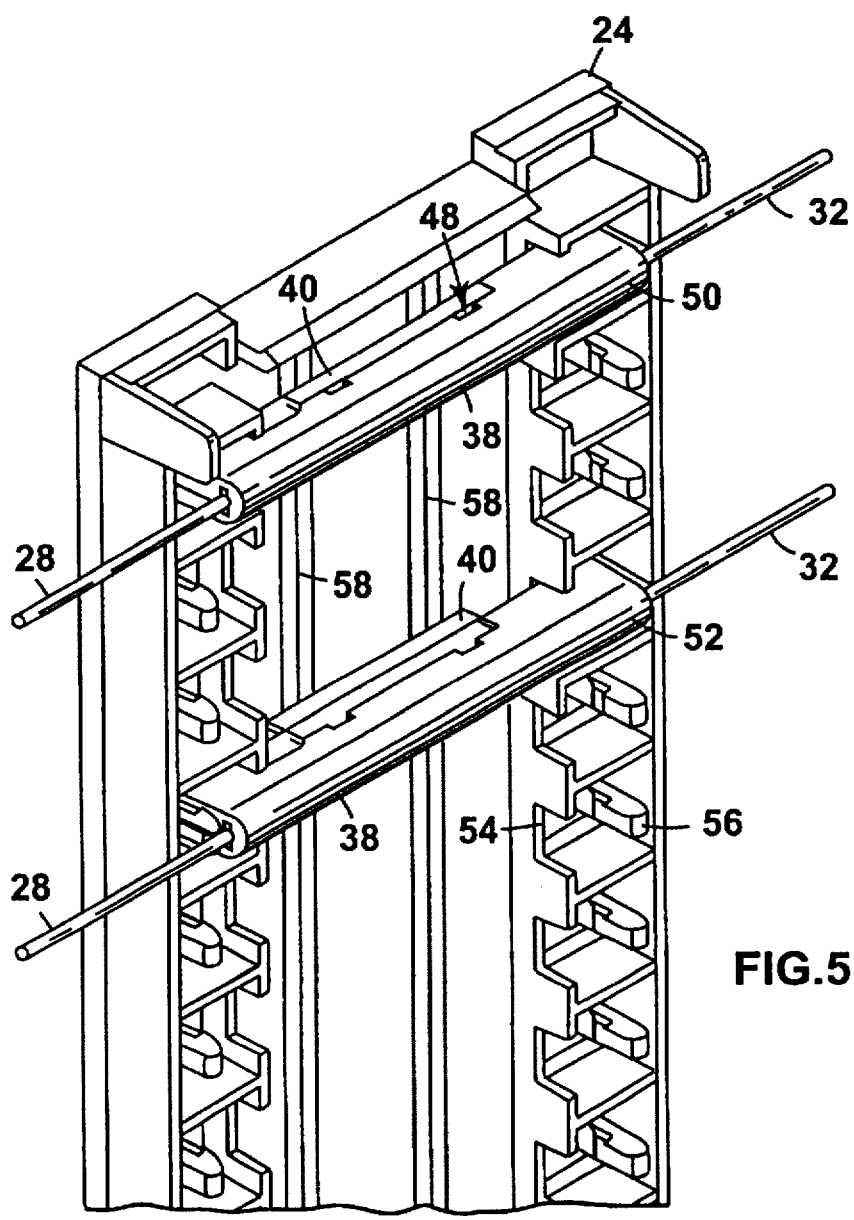
FIG. 5 is partial pictorial view of a connector tray for retaining fiber optic splices which may be utilized in conjunction within the connector card of FIG. 2 to implement the method and system of the present invention.

Next, with reference to FIG. 5, there is illustrated a partial pictorial view of a connector tray which may be utilized to releasably retain fiber optic splices within a connector card 14 in accordance with the method and system of the present invention. As illustrated, connector tray 14 includes multiple slots which may each releasably retain a fiber optic splice such as fiber optic splice 30. As depicted, each slot includes a support ledge 54 at each distal end thereof and an end plug clip 56 which, when mated with end plug 42 of fiber optic splice 30 releasably retains a fiber optic splice 30 within an associated slot. A pair of tray access slots 58 are also provided and may be utilized, as will be illustrated herein, to permit the selective activation and deactivation of each fiber optic splice present within a slot within tray 24. Tray access slots 58 may be a series of in-line slots or may comprise a single slot which runs the length of connector tray 24.

As illustrated within FIG. 5, two fiber optic splice systems are retained within slots within connector tray 24. Fiber optic splice 50 is depicted in the activated mode, that is, cap 40 is fully inserted within jacket 38. In this manner, front plane fiber optic cable 28 and back plane fiber optic cable 32 are mechanically joined in a splice in a manner well known to those having ordinary skill in this art. Still referring to FIG. 5, it may be seen that connector tray 24 may also releasably retain a fiber optic splice 52 in the deactivated position. That is, when cap 40 is only partially inserted within jacket 38. In this position, front plane fiber optic cable 28 and back plane fiber optic cable 32 are adjacent; however, the cables are not physically retained in proximity in the manner necessary to achieve a splice.

Referring now to FIG. 6 there is depicted a perspective view of an activator tool 60, which may be utilized to activate and deactivate a fiber optic spice system within tray 24 in accordance with the method and system of the present invention. As illustrated, activator tool 60 includes a pivot rod 62 and a pivot activator 64. A pivot assembly 66 is mechanically coupled to pivot activator 64 and preferably includes opposing pairs of clips 68 which may be utilized to engage recesses 48 within fiber optic splice 30 (see FIG. 4).

A slide assembly 70 is also provided and, relative movement between pivot assembly 68 and slide assembly 70 may be utilized to activate and deactivate a fiber optic slice 30 in the manner illustrated below.

Finally, with reference to FIGS. 7A-7F there is depicted a series of sectional views which illustrate the activation and deactivation of a fiber optic splice utilizing activator tool 60 of FIG. 6 in accordance with the method and system of the present invention.

As illustrated within FIG. 7A, activator tool 60 is first placed proximate to tray 24 and above a selected fiber optic splice. Force applied to pivot activator 64 along force vectors 76 will cause pivot assembly 66 to pivot about pivot rod 62 and increase the aperture present at the end of pivot assembly 66 by separating clips 68. This force is applied to compress spring 72. As depicted within FIG. 7A, slide assembly 70 also includes a pair of stops 74 which may be moved in a longitudinal fashion toward and away from clips 68.

Next, with reference to FIG. 7B, it may be seen that the force applied to pivot assembly 66 at force vectors 76 has been released and clips 68 have closed under cap 40 of the fiber optic splice system as a result of the bias resultant from the expansion of spring 72. As depicted, clips 68 will rest within tray access slots 58. Next, as depicted within FIG. 7C, a force is applied to the top of slide assembly 70 as indicated at force vector 68, causing a relative movement between slide assembly 70 and pivot assembly 66. In this manner, clips 68 will be urged towards stops 74. Stops 74 will engage the jacket 38 of fiber optic splice 30 and clips 68 will urge cap 40 into the fully inserted and activated position.

In this manner, as those skilled in the art will appreciate, after appropriate preparing and inserting fiber optic cables within the fiber entry port at each end of a fiber optic splice, activator tool 60 may then be utilized to activate fiber optic splice 30 while fiber optic splice 30 is retained within connector tray 24 within the optical fiber distribution system, minimizing the inadvertent torsional or mechanical stresses which may be applied to adjacent cables within optical fiber distribution system 10 by the movement of fiber optic splice devices.

Next, with respect to FIG. 7D, there is illustrated a sectional view of activator tool 60 which depicts the manner in which a fiber optic splice may be deactivated while releasably retained within connector tray 24 within optical fiber distribution system 10. In a manner similar to that depicted within FIG. 7A, a force is applied to pivot activator 64 as illustrated at force vectors 76. As depicted, spring 72 will be depressed and clips 68 will increase in spacing allowing clips 68 to be passed around fiber optic splice 30, as described above.

Next, as depicted within FIG. 7E, the force applied to pivot actuator 64 is removed and clips 68 are permitted to enter recesses 48 within each site of the fiber optic splice as a result of the bias resultant from the expansion of spring 72. Finally, as depicted within FIG. 7F, a downward force is applied to pivot actuator 64, as depicted at force vector 82 and clips 68 are urged downward, away from stops 74. Stops 74 will then engage jacket 38 of the fiber optic splice and cap 40 will be urged in a downward direction, to the intermediate position, indicating that the fiber optic splice is deactivated. In this manner, a fiber optic cable which has previously been inserted within a fiber entry port within the fiber optic splice may be removed and replaced without requiring the physical displacement of fiber optic splice 30.

Upon reference to the foregoing those skilled in the art will appreciate that the connector tray and activator tool of the present invention permit a mechanically activatable fiber optic splice to be both activated and deactivated while releasably retained within an optical fiber distribution system such that inadvertent mechanical or torsional stresses reduced within the spliced fibers or adjacent fibers within the system can be effectively eliminated. In this manner, the likelihood of damaging or degrading an existing connection within an optical fiber distribution system while adding or replacing a fiber optic splice can be effectively eliminated.

While the invention has been particularly shown and described with reference to a preferred embodiment, it will be understood by those skilled in the art that various changes in form and detail may be made therein without departing from the spirit and scope of the invention.

We claim:

1. A system for improved fiber optic splicing within an optical fiber distribution frame, said system comprising:

a connector tray mounted within said optical fiber distribution frame, said connector tray having a plurality of slots therein, each slot adapted to retainably receive a mechanically activatable fiber optic splice;

at least one mechanically activatable fiber optic splice retained within a slot within said connector tray which includes a jacket and a cap and wherein said cap is retained within said jacket in a first intermediate position while said mechanically activatable fiber optic splice is deactivated and is retained within said jacket in a second fully inserted position while said mechanically activated fiber optic splice is activated; and an activator tool for selectively activating and deactivating said at least one mechanically activatable fiber optic splice while said at least one mechanically activatable fiber optic splice is retained within a slot within said connector tray within said optical fiber distribution frame wherein stress induced within optical fibers within said optical fiber distribution frame may be minimized.

2. The system for improved fiber optic splicing according to claim 1 wherein said jacket includes a pair of recesses for permitting a fully inserted cap to be grasped.

3. The system for improved fiber optic splicing according to claim 2 wherein each of said plurality of slots within said connector tray includes a lower planer surface and a pair of retaining clips for receiving each end of a mechanically activatable fiber optic splice and suspending said mechanically activatable fiber optic splice adjacent to said lower planer surface with said cap suspended directly adjacent said lower planer surface.

4. The system for improved fiber optic splicing according to claim 3 wherein said activator tool includes a stop member for selectively engaging a jacket of a mechanically activatable fiber optic splice and a pivot member for surrounding and engaging said cap such that said cap may be urged from said first intermediate position to said second fully inserted position in response to a movement of said pivot member towards said stop member while said mechanically activatable fiber optic splice is retained within a slot within said connector tray.

5. The system for improved fiber optic splicing according to claim 4 wherein said pivot member includes a pair of clips for engaging said pair of recesses such that said cap may be urged from said second fully inserted position to said first intermediate position in response to a movement of said pivot member away from said stop member while said mechanically activatable fiber optic slice is retained within a slot within said connector tray.

6. The system for improved fiber optic splicing according to claim 1 further including at least one fiber retention clip within said optical fiber distribution frame for temporarily imposing a bow within a fiber optic cable during assembly of a fiber optic splice.

7. A method for improved fiber optic splicing within an optical fiber distribution frame, said method comprising the steps of:

releasably retaining a mechanically activatable fiber optic splice within a slot in a connector tray within an optical fiber distribution frame wherein said at least one mechanically activatable fiber optic splice includes a jacket and a cap and wherein said cap is retained within said jacket in a first intermediate position while said mechanically activatable fiber optic splice is deactivated and is retained within said jacket in a second fully inserted position while said mechanically activatable fiber optic splice is activated;

inserting a first fiber optic cable into a first end of said mechanically activatable fiber optic splice;

inserting a second fiber optic cable into a second end of said mechanically activatable fiber optic splice; and thereafter, selectively activating said mechanically activatable fiber optic splice by urging said cap into said second fully inserted position within said jacket while said mechanically activatable fiber optic splice is retained within said connector tray within said optical fiber distribution frame wherein stress induced within optical fibers within said optical fiber distribution frame may be minimized.

8. The method for improved fiber optic splicing according to claim 7 further including the step of retaining said first fiber optic cable within a fiber retention clip within said optical fiber distribution frame such that a bow may be imposed within said first fiber optic cable during splicing.

* * * * *